(12) United States Patent
Łuczak et al.

(10) Patent No.: US 11,027,693 B2
(45) Date of Patent: Jun. 8, 2021

(54) DEVICE COOPERATING WITH VEHICLE SAFETY BELT

(71) Applicants: Maciej Łuczak, Zielonki Parcele (PL); Norbert Gałuszewski, Borzęcin Mały (PL)

(72) Inventors: Maciej Łuczak, Zielonki Parcele (PL); Norbert Gałuszewski, Borzęcin Mały (PL)

( * ) Notice: Subject to any disclaimer, the term of this patent is extended or adjusted under 35 U.S.C. 154(b) by 124 days.

(21) Appl. No.: 16/326,692

(22) PCT Filed: Jul. 20, 2017

(86) PCT No.: PCT/PL2017/000073
§ 371 (c)(1),
(2) Date: Feb. 19, 2019

(87) PCT Pub. No.: WO2018/044183
PCT Pub. Date: Mar. 8, 2018

(65) Prior Publication Data
US 2019/0184932 A1    Jun. 20, 2019

(30) Foreign Application Priority Data
Sep. 1, 2016   (PL) .......................................... 418526

(51) Int. Cl.
*B60R 22/10*   (2006.01)
*B60R 22/02*   (2006.01)
*B60R 22/18*   (2006.01)

(52) U.S. Cl.
CPC .......... *B60R 22/105* (2013.01); *B60R 22/024* (2013.01); *B60R 22/18* (2013.01)

(58) Field of Classification Search
CPC ........................... B60R 22/105; B60R 22/024
See application file for complete search history.

(56) References Cited

U.S. PATENT DOCUMENTS 3,307,872 A * 3/1967 Murcott ................. A61G 1/044
297/468
3,521,901 A * 7/1970 Wackym ................. B60R 22/19
297/483

(Continued)

FOREIGN PATENT DOCUMENTS

DE       201 04 239           9/2001
DE       201 04 239 U1       9/2001

(Continued)

*Primary Examiner* — Nicole T Verley
(74) *Attorney, Agent, or Firm* — Horst M. Kapser, Esq.

(57) ABSTRACT

Device cooperating with a vehicle safety belt, designed for passenger transport, especially children consists of a tensioning belt (1) fixed releasably between the shoulder part (2) and the lap part (3) of the fastened safety belt. Tensioning belt is equipped with the length and tension controller (R) and has tunnels (9) on both ends formed by the rolled up and fixed ends of the belt. In the tunnels (9) there are arms of the snap fasteners (4) fixed to the fastened safety belt. Controller (R) includes a staple (7) fixing the length of the tensioning, belt (1) and a staple (8) blocking its position, and the tensioning belt (1) is composed of a fragment (1') connected permanently with the fixing staple and a fragment (1") connected slidingly with the fixing staple (7) and the staple (8) blocking the position of the belt (1).

2 Claims, 2 Drawing Sheets

(56) References Cited

U.S. PATENT DOCUMENTS

Figure 1:
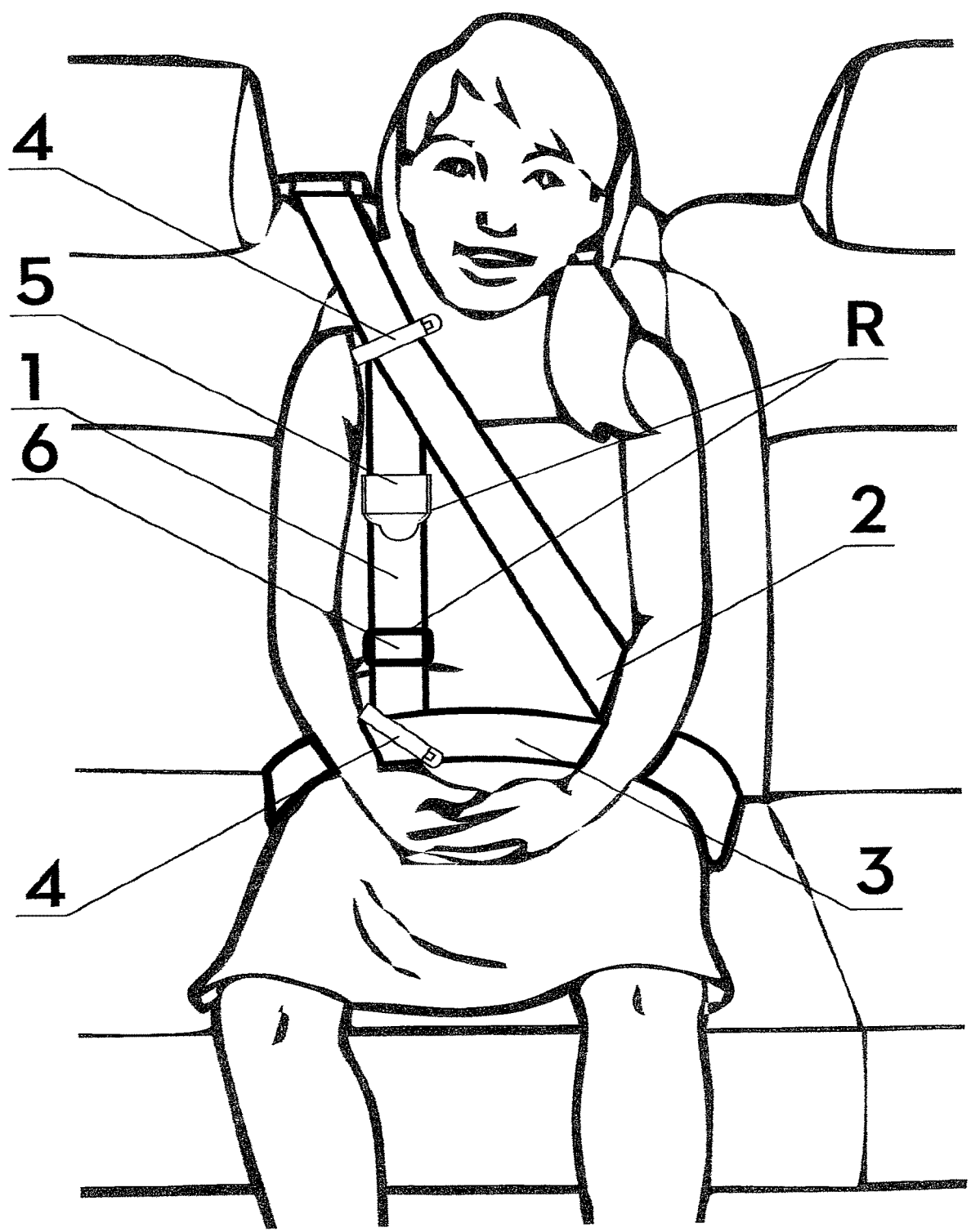

| | | | | |
|---|---|---|---|---|
| 4,758,048 A | * | 7/1988 | Shuman | A44B 11/06 24/200 |
| 4,832,367 A | * | 5/1989 | Lisenby | B60R 22/024 24/265 R |
| 4,840,144 A | * | 6/1989 | Voorhees | B60R 22/105 119/857 |
| 4,840,404 A | | 6/1989 | Falterman et al. | |
| 4,946,198 A | * | 8/1990 | Pittore | B60R 22/024 280/808 |
| 5,080,396 A | | 1/1992 | Vacanti | |
| 5,135,257 A | * | 8/1992 | Short | B60R 22/024 280/801.1 |
| 5,201,099 A | * | 4/1993 | Campbell | A44B 11/04 24/186 |
| 5,540,403 A | * | 7/1996 | Standley | B60R 22/105 24/579.11 |
| 5,570,933 A | * | 11/1996 | Rouhana | B60R 22/023 297/468 |
| 5,605,380 A | * | 2/1997 | Gerstenberger | B60R 22/024 24/170 |
| 5,797,654 A | * | 8/1998 | Stroud | B60N 2/2803 24/196 |
| 6,213,508 B1 | * | 4/2001 | Cornell | B60R 22/02 280/801.1 |
| 7,571,934 B2 | * | 8/2009 | Bell | B60R 22/20 280/801.1 |
| 7,703,806 B2 | * | 4/2010 | Bell | B60R 22/024 280/805 |
| 7,832,770 B2 | * | 11/2010 | Bradley | B60R 22/00 280/808 |
| 2004/0104569 A1 | | 6/2004 | Berger | |
| 2008/0100051 A1 | * | 5/2008 | Bell | B60R 22/105 280/801.1 |
| 2016/0144823 A1 | | 5/2016 | Williams | |

FOREIGN PATENT DOCUMENTS

| | | | |
|---|---|---|---|
| EP | 0 810 130 A2 | | 12/1997 |
| EP | 0810 130 | | 12/1997 |
| FR | 2674803 A1 | * | 10/1992 |
| FR | 2850068 A1 | * | 7/2004 |
| FR | 2854364 | | 11/2004 |
| FR | 2854364 A1 | | 11/2004 |
| GB | 2 261 591 A | | 5/1993 |
| GB | 2261 591 | | 5/1993 |
| GB | 2 353 255 A | | 2/2001 |
| GB | 2353 255 | | 2/2001 |
| KR | 101 574 442 | | 12/2015 |
| KR | 101574442 B1 | | 12/2015 |
| PL | 211 794 | | 6/2012 |
| PL | 211794 B1 | | 6/2012 |
| PL | 211795 B1 | | 6/2012 |
| WO | WO 93/210 44 | | 10/1993 |
| WO | WO 93/21044 | | 10/1993 |
| WO | WO-9736522 A1 | * | 10/1997 |

* cited by examiner

DEVICE COOPERATING WITH VEHICLE SAFETY BELT

The subject of this invention is a device cooperating with a vehicle safety belt, designed for transport of children in 2nd and 3rd age groups, weighing from 15 kg to 36 kg or of short people.

Special arm-chairs fixed to the car seats and equipped with a safety belts system are known and most frequently used for car transport of children.

In Polish patents PL 211794 and PL 211795 safety belts solutions with adjustable length, crossed on the child's chest and fixed to arm-chair's supports are presented.

In turn, other solutions, substituting arm-chairs for transport of children, consist of adaptation of the existing safety belts for adults to the children's height.

From the Korean patent KR 101574442 a solution is known in which a special device is used which shortens the shoulder part of the safety belt and increases its inclination angle. The device is fixed to the vertical part of the frame of the car seat backrest and contains protruding hooks for the fixing element in the form of a square. One arm of the square is fixed on a selected hook, and the other arm has a slit through which the shoulder part of the safety belt, adjusted to the child's height, passes.

From the patent application WO 93/21044 a system of cooperating safety belts for car transport of children is known. The additional belt has an adjustable length and is fixed releasably through snap fasteners at the ends of that belt to the fastened safety belt, between the shoulder part and the lap part. The additional belt is equipped with length and tension controller.

In accordance with this invention the device cooperating with vehicle safety belt, designed for passenger transport, especially children, consists of a tensioning belt, fixed releasably with the use of snap fasteners, between the shoulder part and the lap part of the fastened safety belt. Tensioning belt is equipped with length and tension controller, and has tunnels on both ends formed by rolled up and fixed ends of the belt. In the tunnels there are the of the snap fasteners, fixed to the fastened safety belt in the shoulder part and the lap part. The controller has a staple fixing the length of the tensioning belt and a staple blocking its position. Tensioning belt is composed of a fragment connected permanently with the fixing staple and a fragment connected slidingly with the fixing staple and the staple blocking the position of the belt.

The device is fixed on fastened safety belts by placing the tensioning belt and by shutting fasteners on the shoulder part and the lap part of the safety belt. Then, with the use of the controller, the length and the tension of the tensioning belt is adapted to the child's height, causing shortening of the shoulder part of the safety belt, supporting the child and an increase of the inclination angle of that fragment of the belt vertically.

An essential advantage of the device according to this invention is its simple and useful construction, easy to assemble, allowing to eliminate special arm-chairs for transport of children in the 2nd and 3rd age groups. Application of the device results in shortening of the shoulder part of the safety belt supporting the child and an increase of the inclination angle of that fragment of the belt vertically. Due to application of length and tension control of the tensioning belt it is possible to transport safely children and persons with various heights and figures. This solution meets European standards ECE R44, American standard FMVSS, Asian MLIT, and Arab Saso concerning safe transport of children.

Figure 2:
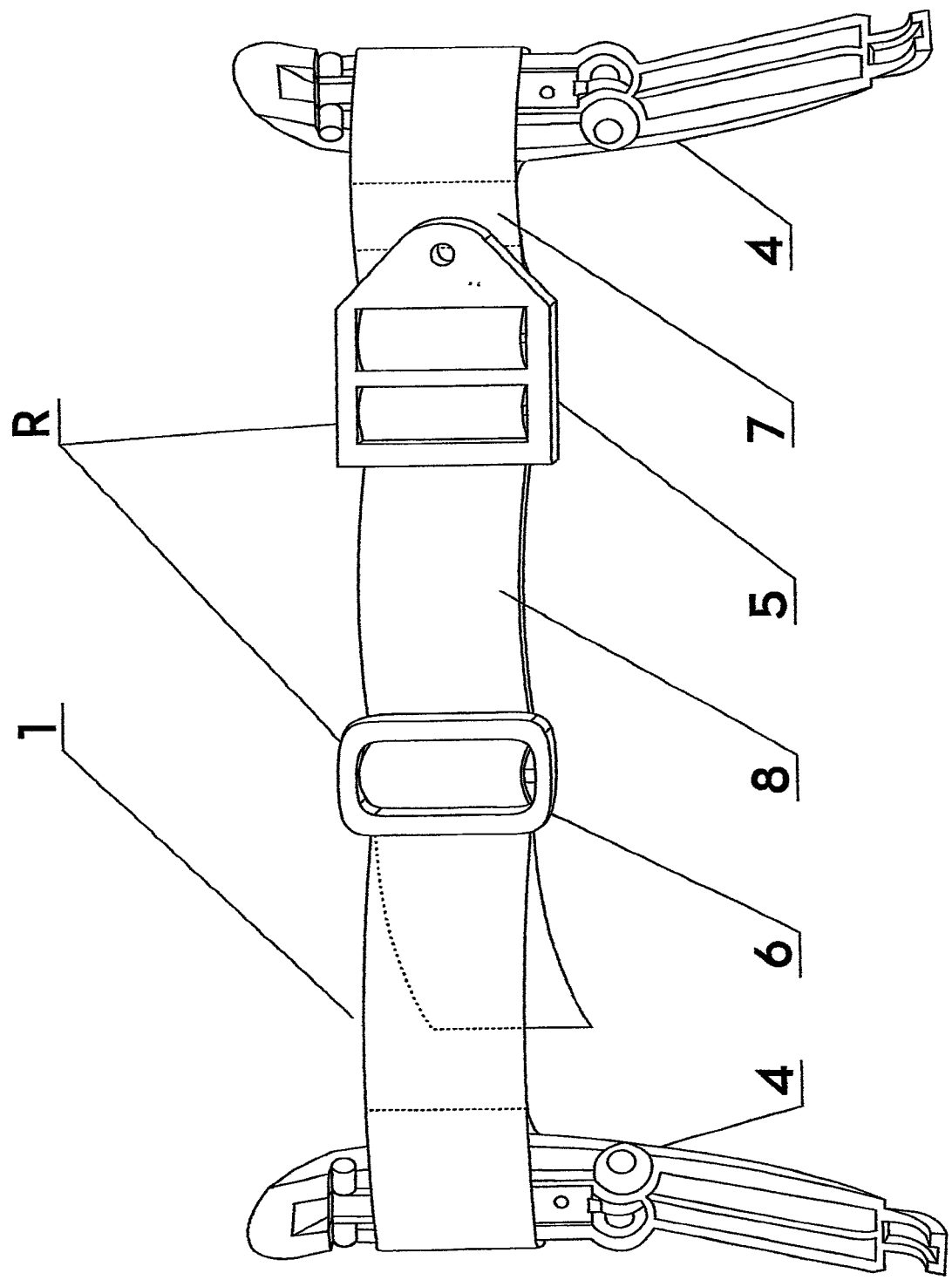

The subject of this invention is explained in more detail on the example of execution on the drawing, where FIG. 1 presents the general view of the device cooperating with the safety belt supporting the child, and FIG. 2—the general view of the device.

In accordance with the drawing, the device securing the child in a car arm-chair, cooperating with the safety belt, consists of a tensioning belt 1 with adjustable length. Belt 1 is fixed releasably between the shoulder part 2 and the lap part 3 of the fastened safety belt through snap fasteners 4 at the ends of the belt 1. Tensioning belt 1 is equipped with the length and tension controller R. Controller R includes a staple 5 fixing the length of the tensioning belt 1 and a staple 6 blocking its position. In turn, tensioning belt 1 is composed of a fragment 7 connected permanently with the fixing staple 5 and a fragment 8 connected slidingly with the fixing staple 5 and a staple 6 blocking the position of the belt 1.

Tensioning belt 1 has tunnels 9 on both ends, formed by rolled up ends of the belt 1, fixed by sewing. In the tunnels 9 there are arms of the snap fasteners 4, fixed to the fastened safety belt in the shoulder 2 part and the lap 3 part.

The device is fixed on the fastened safety belt by placing the belt 1 and by shutting the fasteners 4 in the shoulder part 2 and in the lap part 3 of the safety belt. Then, with the use of the controller R the length and the tension of the tensioning belt 1 are adapted to the child's height, causing shortening of the shoulder part 2 of the safety belt supporting the child and an increase of the inclination angle of that fragment of the belt vertically.

The invention claimed is:

1. A device cooperating with the vehicle safety belt, designed for passenger transport, especially children, consisting of a tensioning belt fixed releasably with a help of snap fasteners between the shoulder part and a lap part of the fastened safety belt characterized in that the tensioning belt (1) has tunnels (9) on both ends in which there are arms of the snap fasteners (4) fixed to the fastened safety belt in the shoulder (2) part and the lap (1) part, where the controller (R) has a staple (5) fixing the length of the tensioning belt (1), and the tensioning belt (1) consists of a fragment (7) connected permanently with the fixing staple (5) and a fragment (8) connected slidingly with the fixing staple (5) and a staple (6) blocking the position of the belt (1).

2. The device according to claim 1 characterized in that tunnels (9) of the tensioning belt (1) are formed by rolled up and fixed ends of the belt (1).

* * * * *